(12) United States Patent
Frew et al.

(10) Patent No.: US 7,567,098 B2
(45) Date of Patent: Jul. 28, 2009

(54) MULTI-THRESHOLD RESET CIRCUIT

(75) Inventors: Louis Frew, Glasgow (GB); Stuart Kincaid, Glasgow (GB)

(73) Assignee: ATMEL Corporation, San Jose, CA (US)

( * ) Notice: Subject to any disclaimer, the term of this patent is extended or adjusted under 35 U.S.C. 154(b) by 241 days.

(21) Appl. No.: 11/513,535

(22) Filed: Aug. 31, 2006

(65) Prior Publication Data

US 2008/0122499 A1 May 29, 2008

(51) Int. Cl.
*H03L 7/00* (2006.01)
(52) U.S. Cl. .................... 327/143; 327/142; 327/198
(58) Field of Classification Search .................. 327/143
See application file for complete search history.

(56) References Cited

U.S. PATENT DOCUMENTS

| | | | |
|---|---|---|---|
| 4,001,609 A | 1/1977 | Sickert | |
| 4,461,963 A | 7/1984 | Koomen | |
| 5,203,000 A | 4/1993 | Folkes | |
| 5,212,412 A | 5/1993 | Atriss et al. | |
| 5,513,062 A | 4/1996 | Paul | |
| 5,523,709 A | 6/1996 | Phillips et al. | |
| 5,534,804 A | 7/1996 | Woo | |
| 5,553,070 A | 9/1996 | Riley | |
| 5,562,595 A | 10/1996 | Neisz | |
| 5,612,642 A | 3/1997 | McClintock | |
| 5,631,854 A | 5/1997 | Riley | |
| 5,684,343 A | 11/1997 | Riley | |
| 5,691,659 A | 11/1997 | Riley | |
| 5,760,624 A | 6/1998 | McClintock | |
| 5,821,787 A * | 10/1998 | McClintock et al. | ........ 327/143 |
| 5,883,532 A | 3/1999 | Bowers | |
| 6,738,268 B1 | 5/2004 | Sullivan | |

OTHER PUBLICATIONS

Maxim "Single-/Dual-/Triple-Voltage µP Supervisory Circuits with Independent Watchdog Output," available at http://pdfserv.maxim-ic.com/en/ds/MAX6730-MAX6735.pdf, Jan. 2003, 16 pages.
Maxim "4-Pin, Ultra-Low-Voltage, Low-Power µP Reset Circuits with Manual Reset," available at http://pdfserv.maxim-ic.com/en/ds/MAX6335-MAX6337.pdf, Dec. 2005, 7 pages.

(Continued)

*Primary Examiner*—Kenneth B Wells
*Assistant Examiner*—Daniel Rojas
(74) *Attorney, Agent, or Firm*—Fish & Richardson P.C.

(57) ABSTRACT

A device can include one or more circuits that are configured to be powered by a supply voltage having a specified minimum operating value and a specified nominal operating value; and a reset circuit having a first voltage threshold and a second voltage threshold, the first voltage threshold having a value between the specified minimum operating value and the specified nominal operating value, the second voltage threshold having a value that is less than the specified minimum operating voltage. The reset circuit can be configured to a) reset the one or more circuits when the device is functioning in a first mode and the supply voltage drops below the first threshold and b) reset the one or more of circuits when the device is functioning in a second mode and the supply voltage drops below the second threshold.

35 Claims, 5 Drawing Sheets

OTHER PUBLICATIONS

Atmel "Secure Microcontrollers for Smart Cards, AT90SC Summary," available at http://www.atmel.com/dyn/resources/prod_documents/1065s.pdf, Oct. 1999, 7 pages.

Atmel "8-bit Microcontroller with 8K Bytes In-System Programmable Flash, AT90PWM2, AT90PWM3, AT90PWM2B, AT90WM3B," available at http://www.atmel.com/dyn/resources/prod_documents/doc4317.pdf, May 2006, 354 pages.

SGS-Thomson Microelectronics L6000 Single Chip Read & Write Channel Advance Data, available at http://www.ortodoxism.ro/datasheets/SGSThomsonMicroelectronics/mXrxyvu.pdf, Aug. 1994, 24 pages.

* cited by examiner

MULTI-THRESHOLD RESET CIRCUIT

TECHNICAL FIELD

The disclosed implementations relate to electrical circuits.

BACKGROUND

Some electrical devices require voltages within a specified range bounded by a minimum supply voltage and a maximum supply voltage in order to operate in a predictable manner. That is, in order to have a defined behavior where outputs are deterministic and causally related to inputs, an electrical device generally requires a minimum supply voltage and may not function at voltages greater than the maximum supply voltage. At voltages below the minimum supply voltage or above the maximum supply voltage, the electrical device may function, function in a limited manner, function erratically or in a temperature-dependent manner, or not function at all. Typically, the exact electrical device behavior outside a specified range of supply voltages is not deterministic. Some variation in supply voltage requirements can exist between one instance of a given electrical device (e.g., an integrated circuit) and another instance of the same give electrical device. For example, variations in manufacturing process parameters of two different production lots of the same integrated circuit can result in one production lot having one minimum (or maximum) supply voltage requirement, and a second production lot having a lower minimum supply voltage requirement (or higher maximum supply voltage requirement). To account for such variation, a manufacturer can determine, by testing, minimum or maximum supply voltage requirements of several production lots of a particular device, then add a margin to the highest (or lowest) determined supply voltage requirement to arrive at a specified minimum (or maximum) operating voltage requirement. A specified minimum operating voltage requirement generally represents a conservative minimum voltage, above which devices from any production lot are likely (e.g., 95% likely) to function in a deterministic manner (within other specified parameters, such as, for example, current and temperature ranges).

To ensure that an electrical device in a particular system functions in a deterministic manner, hardware designers can include conventional reset circuits in the system that can be used to prevent portions of the system from functioning at all if supply voltages are below specified minimum values. Conventional reset circuits can be particularly important at two different times to a system that includes electrical devices: during initial power-up, when the supply voltage of a system "ramps up"; and during brownout conditions that can occur during operation of the system, during which the supply voltage temporarily dips below a specified minimum voltage. During power-up, a conventional reset circuit can hold a device to which it is connected in a reset state until a corresponding supply voltage reaches a minimum voltage (what is commonly referred to as a power-on reset (POR) circuit). During normal operation, a conventional reset circuit can assert a reset signal to the device to which is connected in order to prevent the device from operating in an unpredictable or nondeterministic manner (e.g., possibly generating or propagating erroneous signals in the system). Some systems include multiple devices or circuits that each operate at different nominal voltage levels, and that can have different specified minimum voltage levels. Such systems can include multiple reset circuits (e.g., one reset circuit for each voltage level).

SUMMARY

A system that has a reset circuit for holding portions of the system in a reset state during an initial power-up phase or for transitioning the system to a reset state during a brownout condition can, in some implementations, benefit from low-voltage testing. For example, in some implementations, a system's behavior during testing at voltages that are lower than a specified minimum voltage can serve as a predictor of the system's reliability in the field. As a more specific example, a device such as a memory circuit or microcontroller may be more likely to fail in the field if it fails certain testing at a first voltage that is just below a specified minimum voltage than a similar device that successfully completes the same testing at an even lower voltage (e.g., a voltage that is below the specified minimum voltage and even lower than the first voltage). Put another way, in some implementations, devices with more operating voltage "margin" relative to a specified minimum operating voltage will be more likely to operate without failure in the field than similar devices with less margin relative to the specified minimum operating voltage. Accordingly, low-voltage testing of systems or devices can be advantageous. Similarly, high-voltage testing of systems or devices can also be advantageous.

To facilitate low-voltage testing, a reset circuit can include at least two voltage thresholds: a testing threshold and an operating threshold. During normal operation, the reset circuit can use an operating threshold, which is generally at or above a corresponding specified minimum voltage, to transition a connected device to a reset state if the corresponding supply voltage drops below the specified minimum voltage (e.g., too low for deterministic operation); during testing (e.g., initial manufacturing testing), the reset circuit can use a lower test threshold, which can be below a corresponding specified minimum voltage, to allow the connected device to be tested at lower-than-normal voltages.

In some implementations, a device includes one or more circuits that are configured to be powered by a supply voltage; and a reset circuit having a first mode and a second mode, the first mode having a first voltage threshold and a second voltage threshold, the second mode having a third voltage threshold. The reset circuit can be configured to a) reset the one or more circuits in response to a level of the supply voltage relative to the first voltage threshold or second voltage threshold when the reset circuit is in the first mode and b) reset the one or more circuits in response to the level of the supply voltage relative to the third voltage threshold when the reset circuit is in the second mode.

In some implementations, the reset circuit is configured to assert the reset signal when the reset circuit is in the first mode and the supply voltage drops below the second threshold or when the reset circuit is in the second mode and the supply voltage drops below the third threshold; the third threshold can be lower than a specified minimum voltage for one of the one or more circuits. In some implementations, the reset circuit is configured to assert the reset signal when the reset circuit is in the first mode and the supply voltage exceeds the second threshold or when the reset circuit is in the second mode and the supply voltage exceeds the third threshold; the third threshold can be higher than a specified maximum voltage for one of the one or more circuits. The reset circuit can be configured to assert the reset signal during a power-up phase and deassert the reset signal when the supply voltage exceeds the first threshold.

The one or more circuits can include at least one of a memory circuit or an embedded microcontroller. The device can further include a reset mode selector to configure the reset circuit to function in either the first mode or the second mode. The reset mode selector can be configured to disable the second mode until the supply voltage has initially exceeded the first threshold. Configuring the reset circuit to function in either the first mode or the second mode can include providing a signal to the reset circuit that has either a first state or a second state, respectively; in some implementations, the first state is a logic '1' and the second state is a logic '0.' In some implementations, the reset mode selector includes a switching element having a first switching state and a second switching state and that, when in the second switching state, disables one of the first mode or the second mode. In some implementations, once in the second switching state, the switching element remains in the second switching state, such that either the first mode or the second mode is irreversibly disabled. The switching element can be a fuse element, the first switching state can be a closed state and the second switching state can be an open state; the fuse element can be configured to be transitioned from a closed state to an open state at the end of a manufacturing test process. In some implementations, the reset mode selector includes a register whose current value configures the reset circuit to function in either the first mode or the second mode. In some implementations, the reset mode selector includes an external pin whose current voltage level configures the reset circuit to function in either the first mode or the second mode.

In some implementations, a device includes one or more circuits that are configured to be powered by a supply voltage having a specified minimum operating value and a specified nominal operating value; and a reset circuit having a first voltage threshold and a second voltage threshold, the first voltage threshold having a value between the specified minimum operating value and the specified nominal operating value, the second voltage threshold having a value that is less than the specified minimum operating voltage. The reset circuit can be configured to a) reset the one or more circuits when the device is functioning in an operating mode and the supply voltage drops below the first threshold and b) reset the one or more of circuits when the device is functioning in a test mode and the supply voltage drops below the second threshold.

In some implementations, a method of resetting a device includes determining when the device is in a first mode, and if so, asserting a reset signal to one or more circuits in the device based on a level of a supply voltage relative to a first threshold; and determining when the device is in a second mode, and if so, asserting the reset signal to the one or more circuits based on the level of the supply voltage relative to a second threshold.

In some implementations, asserting the reset signal based on the value of the supply voltage relative to the first threshold includes asserting the reset signal when the level of the supply voltage exceeds the first threshold; asserting the reset signal based on the value of the supply voltage relative to the second threshold can include asserting the reset signal when the level of the supply voltage exceeds the second threshold, wherein the second threshold is higher than the first threshold. In some implementations, asserting the reset signal based on the value of the supply voltage relative to the first threshold includes asserting the reset signal when the level of the supply voltage drops below the first threshold; asserting the reset signal based on the value of the supply voltage relative to the second threshold can include asserting the reset signal when the level of the supply voltage drops below the second threshold, wherein the second threshold is lower than the first threshold.

The first threshold can be a specified minimum operating value of device, the specified minimum operating value being a voltage value at which instances of the device from different production lots have a likelihood that exceeds a minimum threshold of functioning in a deterministic manner; the minimum threshold can be at least 95%. Determining when the device is in the first mode can include determining whether a reset mode selector circuit is currently outputting a signal having a first state.

The method can further include initially asserting the reset signal in a power-up phase during which the supply voltage increases from a low value toward a specified nominal operating value, and deasserting the reset signal when the supply voltage increases above a third threshold. In some implementations, the third threshold and the first threshold differ by a first, non-zero voltage; and the third threshold and the second threshold differ by a second, greater absolute voltage. The method can further include disabling the second mode until the supply voltage initially increases above the third threshold.

In some implementations, a method of resetting a device includes determining when the device is in a first mode, and if so, asserting a reset signal to one or more circuits associated with the device when a supply voltage decreases below a first threshold, the first threshold having a value between a specified minimum operating value and a specified nominal operating value; and determining when the device is in a second mode, and if so, asserting the reset signal to the one or more circuits when the supply voltage decreases below a second threshold, the second threshold having a value that is less than the specified minimum operating value. The first mode can be a normal operating mode and the second mode is a production test mode. The production test mode can be one in which the device is adapted be tested at voltages lower than the specified minimum operating value.

In some implementations, a method of testing a device includes providing to the device a reduced supply voltage, the reduced supply voltage having a value that is less than a specified minimum operating value of the device; testing the device at the reduced supply voltage; and preventing a reset signal from being asserted when the provided supply voltage is less than the specified minimum operating level but more than a threshold level. The method can further include allowing the reset signal to be asserted when the provided supply voltage is less than the threshold level. The method can further include configuring a mode selector to activate a test mode for circuitry corresponding to the reset signal. The method can further include reconfiguring the mode selector to disable the test mode after testing the device at the reduced supply voltage.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
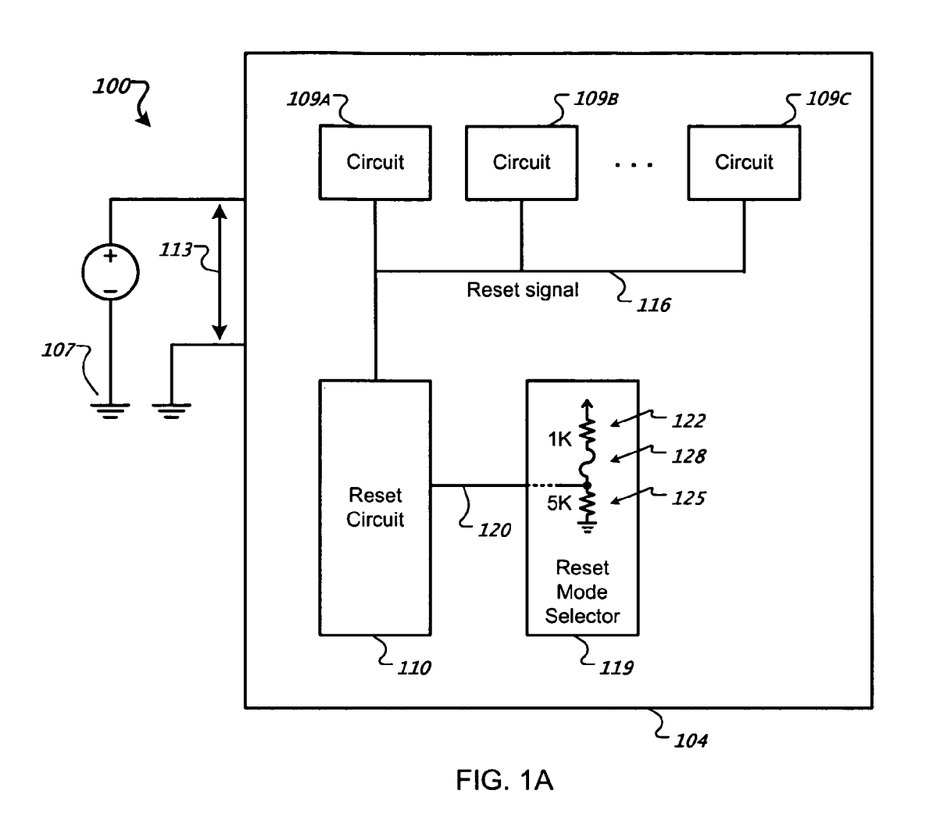
FIG. 1A shows a block diagram of a device that includes an exemplary multi-threshold reset circuit.

FIG. 1A is a block diagram of a system 100 that includes a device 104 having an exemplary multi-threshold reset circuit 110 that monitors a supply voltage of a corresponding source (e.g., a power supply 107). In addition to the reset circuit 110, the device 104 has a number of circuits 109A, 109B, and 109C that can perform various functions. During normal operation, the power supply 107 provides a supply voltage 113 to the device 104, and in particular, to the circuits 109A-109C within the device 104. The reset circuit 110 monitors the supply voltage 113 and asserts a reset signal 116 to one or more of the circuits 109A-C if the supply voltage 113 is below an operating threshold level.

In some implementations, the reset circuit 110 has one or more modes, and each mode has one or more thresholds. For example, in some implementations, the reset circuit 110 has two modes: a first mode (e.g., a normal operating mode) and a second mode (e.g., a test mode), and the threshold(s) can be different in each mode. In particular, for example, the reset circuit 110 can assert the reset signal 116 during either a first mode (e.g., an operating mode) or a second mode (e.g., a test mode) as soon as the supply voltage 113 reaches a first level that causes an output of the reset circuit 110 to be defined. After the supply voltage 113 reaches a second level, the reset signal can be deasserted. The second level can be different depending on whether the reset circuit is in the first mode (e.g., operating mode) or the second mode (e.g., test mode). For example, the reset signal can, in some implementations, be released when the supply voltage 113 is at a lower level during the second mode (e.g., test mode) than during the first mode (e.g., operating mode). If the supply voltage falls below one or more thresholds within a mode (e.g., reassertion thresholds), various other actions can be taken. For example, in one implementation, during a first mode (e.g., operating mode), actions can be taken based on four different thresholds: a first threshold can cause the reset circuit 110 to issue a "warning" signal, such as a signal to a power supply indicating a low-voltage condition; a second (e.g., lower) threshold can cause the reset circuit 110 to assert the reset signal 116; a third (e.g., even lower) threshold can cause the device 104 to shut down. And a fourth threshold can cause the reset signal to be deasserted, if the device 104 has not already been shut down. During a second mode (e.g., test mode), actions can be taken based on one or more similar or different thresholds.

In each mode, the threshold can be different depending on whether the supply voltage 113 is initially ramping up during a power-up phase, or whether the supply voltage 113 is dipping low during, for example, a brownout condition. For example, the device 104 can have one deassertion threshold for releasing the reset signal following initial power-up and a different deassertion threshold for releasing the reset signal following a brownout condition.

Although the reset circuit 110 and thresholds are described above in the context of responding to low-voltage conditions, the systems, methods and techniques described herein can be applied to high-voltage conditions or to other desired operating parameters. For example, action can be taken (e.g., a reset or other signal can be asserted or deasserted) based on over/under-current conditions, over/under-temperature conditions, over/under-humidity conditions, over/under-EMI (electromagnetic interference (or, alternatively, electromagnetic emissions)), over/under-frequency of a clock, etc. Thresholds can be defined in terms of direct current (DC) voltage, root mean square (RMS) or peak alternating current (AC) voltage, AC voltage phases, etc. Exemplary thresholds are further described with reference to FIGS. 2A and 2B.

To select the mode of the reset circuit 110 (e.g., a normal operating mode or a test mode), the device 104 includes a reset mode selector 119. Although reference is made in various portions of this description to a circuit having two modes, other numbers of modes are possible including one or more modes. In one implementation, the reset mode selector 119 provides a signal 120 (e.g., a digital signal) to the reset circuit 110 to select the mode. For example, a logic '1' on the signal 120 can select the test mode, and a logic '0' on the signal 120 can select the normal operating mode.

In the implementation as shown, the reset mode selector 119 employs a pull-up resistor 122, a pull-down resistor 125 and a switching element 128 (e.g., a fuse) to drive the signal 120. As shown, the pull-up resistor 122 is stronger than the pull-down resistor 125. In this configuration and where the switching element is set (e.g., intact, if the switching element is a fuse, as discussed in more detail below), the signal 120 will remain at a first predetermined level (e.g., be at a logic '1' state), thereby selecting the test mode. If the switching element 128 is reset (e.g., the fuse is blown), the signal 120 is pulled to a different level (e.g., a logic '0' state) thereby selecting the normal operating mode.

Figure 1B:
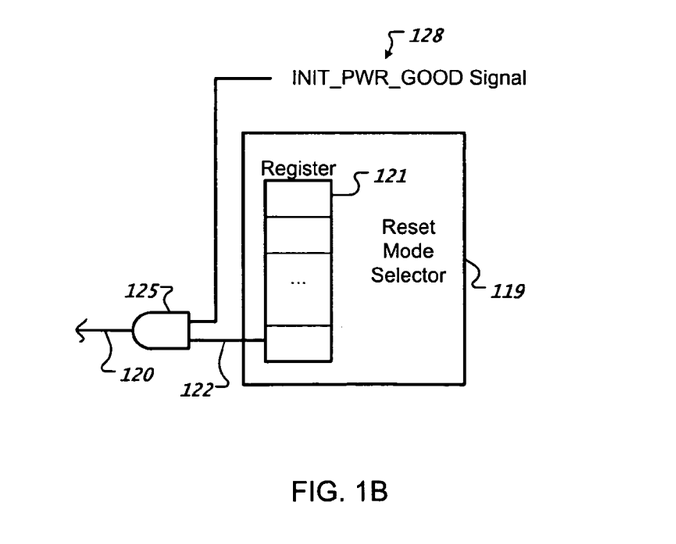
FIG. 1B shows an exemplary circuit that can protect the reset circuit during an initial power-up phase.

Other circuits for configuring the mode of the reset circuit 110 are contemplated. For example, in one implementation, as shown in FIG. 1B, the mode of the reset circuit 110 can be controlled by a portion of a register 121 internal to the device 104. The register 121 can be user-programmable through an external interface (not shown) of the device 104, and in some implementations, the register 121 can have an initial default value (e.g., a value that specifies the first mode (e.g., normal operating mode)). In other implementations, the signal 120 can be connected to an external pin (not shown) of the device 104, and the level (e.g., logic state) of that external pin can select the mode. In other implementations, the mode of the reset circuit 110 can be determined based on which circuits 109A-C are active in the device 104. For example, the reset circuit 110 can be configured to operate in a test mode if the circuit 109A is active; and if the circuit 109A is not active, the reset circuit 110 can be configured in a normal operating mode. For example, the circuit 109A can, in some implementations, include JTAG (Joint Test Action Group) test circuitry (e.g., an IEEE 1149.1 boundary-scan chain) that is only used during testing or initial configuration of the device 104. Accordingly, in this implementation, the reset circuit 110 can be configured to be in test mode whenever the JTAG test circuitry is active; otherwise, the reset circuit can be configured to be in a normal operating mode. Other methods of configuring the mode of the reset circuit are possible. Further, other numbers of modes, types of signals and signaling are possible.

In one implementation, as shown in FIG. 1B, the output 122 of the reset mode selector 119 is gated by a circuit 125 before being provided to the reset circuit 110. In particular, as shown, the circuit 125 includes an AND gate that logically combines a mode configuration value 122 provided by the register 121 with an "INIT_PWR_GOOD" signal 128, which, in this implementation, indicates that power has initially stabilized. The circuit 125 can prevent the reset circuit from entering the second mode (e.g., test mode), for example, when the supply voltage 113 is too low for even the reset circuit 110 to initially stabilize. In particular, the circuit 125 can disable the second mode (e.g., the test mode) until the supply voltage 113 has reached a sufficient level (e.g., the deassertion threshold 210, which is described with reference to FIG. 2A) for the register 121 to have a deterministic state. At that point, if the register 121 specifies that the reset circuit is to be configured in the second mode, the circuit 125 provides the appropriate signal 120 (e.g., a logic '1') to the reset circuit 110 to configure the reset circuit 110 in the second mode. Before the supply voltage 113 reaches a sufficient level for the register 121 to have a deterministic state, the reset circuit 110 is limited, in some implementations, to operation in the first mode. In this manner, the circuit 125 can, in some implementations, eliminate causality problems that may otherwise exist if the register 121 were employed to determine a threshold (e.g., set a mode) when the register 121 itself was incapable of initially deterministically operating below the threshold level the register 121 was to determine.

In one implementation, the device 104 is manufactured with the reset mode selector 119 as shown (i.e., with the switching element 128 in a first position (e.g., a fuse that is intact)). Accordingly, the device 104 is initially configured to be in a test mode, which can facilitate low-voltage testing of the device 104. Following a manufacturing testing process, the switching element 128 can be reset (e.g., the fuse can be blown—irreversibly disabling the test mode, in some implementations).

Where the switching element 128 is a fuse, the fuse can be blown in a number of ways. In some implementations, the switching element 128 is physically accessible during a manufacturing test process (e.g., the device 104 can be initially tested before being packaged, and the switching element 128 can be reset (e.g., blown, if a fuse) just before packaging. In some implementations, the switching element 128 can be reset (e.g., blown, if a fuse) through application of energy to a portion of the device 104 (e.g., a voltage or current pulse can be applied to a particular external pin of a packaged device 104 to change the setting of the switching element 128; or a laser pulse, or other radiation, can be applied to the reset mode selector 119 to change the setting). In some implementations, the switching element 128 is resettable and can be temporarily opened as described above or in some other manner. In such implementations, the switching element 128 can be disposed in the pull-down leg of the reset mode selector 119, such that temporarily opening the switching element 128 causes the device 104 to be in a test mode.

The device 104 and power supply 107 can represent many different systems. The exact nature of the device 104 is not critical to the methods and systems described herein. For example, the device 104 can be an embedded microcontroller having a controller core that fetches and executes instructions in an embedded memory, such as SRAM, Flash memory, ROM or EEPROM. The device 104 can be a microprocessor that executes program instructions stored in volatile or nonvolatile memory. The device 104 can be a circuit for controlling power in another device, such as an uninterruptible power supply. The device 104 can reside on a single printed circuit board, multiple circuit boards, a single die, or multiple dies.

As shown, the power supply 107 provides a single supply voltage 113 to the device 104. However, in some implementations, more than one power supply can provide multiple voltages to the device 104, and the reset circuit 110 can monitor two or more of the multiple voltages and provide multiple reset signals in response to values of any or all of the monitored voltages.

Figure 2A:
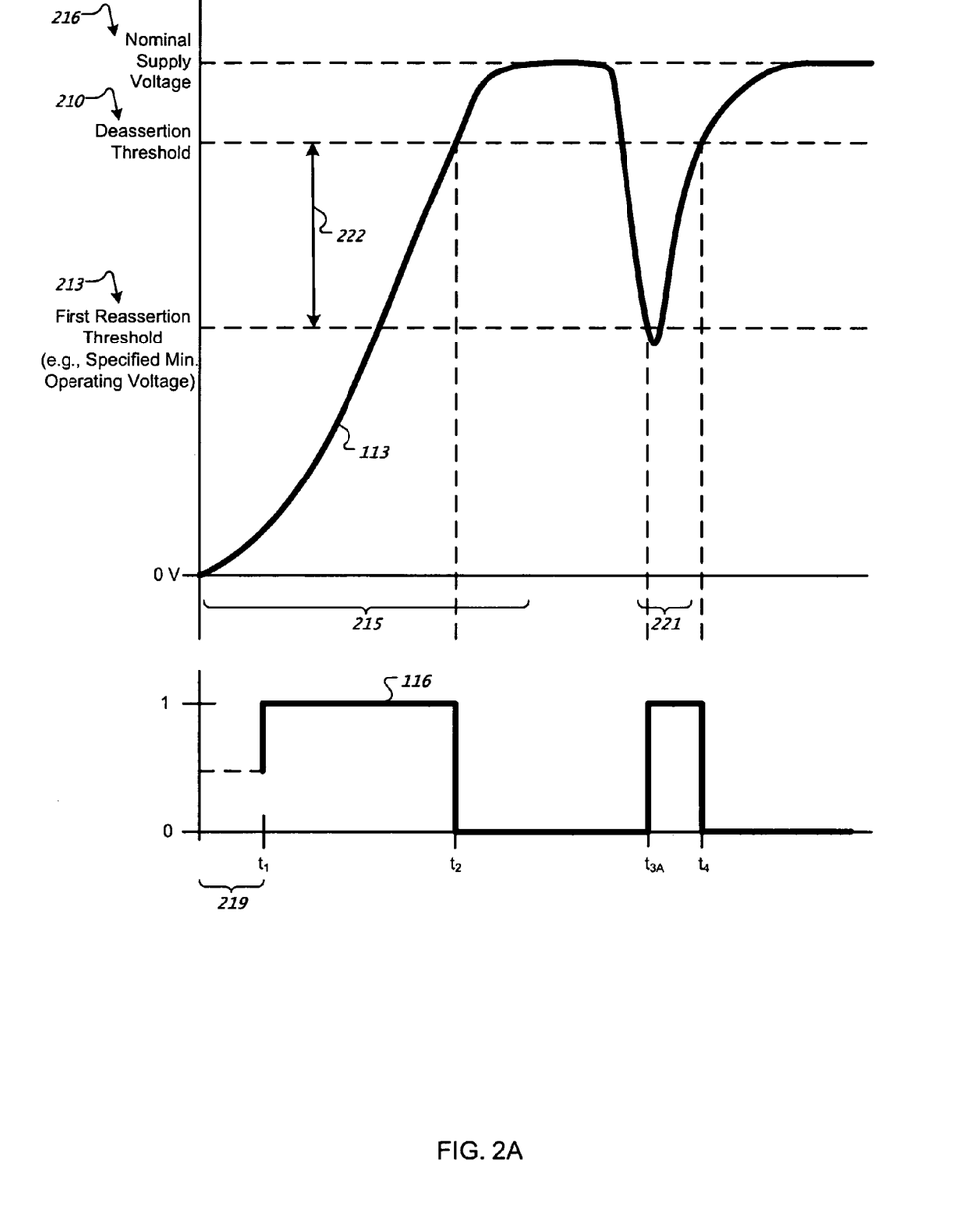
FIG. 2A is an exemplary voltage-time diagram showing a supply voltage and corresponding reset signal in a normal operating mode.

FIG. 2A is a exemplary "normal operating mode" voltage-time diagram showing the supply voltage 113 for the device 104 that is shown in FIG. 1A. In FIG. 2A, the supply voltage 113 is shown relative to a deassertion threshold 210 and a first reassertion threshold 213. In some implementations, the first reassertion threshold 213 is a specified minimum operating voltage for the device 104. FIG. 2A further illustrates the corresponding reset signal 116 (also shown in FIG. 1A) that can be asserted (depicted by level '1') or deasserted (depicted by level '0') based on a magnitude of the supply voltage 113. As shown, the supply voltage 113 ramps up during an initial power-up phase 215 from an initial voltage (e.g., 0 V), to a nominal supply voltage 216. The nominal supply voltage 216 can be the "normal" or "rated voltage" of the device 104. For example, a 3.3 V integrated circuit has a nominal supply voltage of 3.3 V.

Initially, in some implementations, the reset signal 116 is undefined when the supply voltage 113 is very low (depicted by phase 219). After the supply voltage 113 reaches a high enough value for the reset signal 116 to be defined (e.g., at time $t_1$), the reset signal 116 is asserted and remains asserted until the supply voltage 113 exceeds the deassertion threshold 210 (e.g., at time $t_2$). Once the supply voltage 113 reaches the deassertion threshold 210, the reset signal 116 can be deasserted, as shown, and the device 104 can commence normal operation.

During normal operation, in some implementations, the supply voltage 113 can fluctuate between the nominal supply voltage 216 and the first reassertion threshold 213 without the reset circuit 110 reasserting the reset signal 116. However, in some implementations, as shown, when the supply voltage 113 drops below the first reassertion threshold 213 in the normal operating mode (e.g., at time $t_{3,4}$, during a brownout condition (depicted by phase 221)), the reset circuit 110 reasserts the reset signal 116. In some implementations, once the reset signal 116 is reasserted, it remains asserted until the supply voltage 113 again rises above the deassertion threshold 210 (e.g., at time $t_4$), which may correspond to a time when the supply voltage 113 recovers from the brownout condition. In some implementations (not shown), the deassertion threshold following a brownout condition is different than the reassertion threshold 210 following initial power-up.

The difference in voltage 222 between the deassertion threshold 210 and the first reassertion threshold 213 can provide hysteresis to prevent the reset circuit 110 from oscillating or otherwise becoming unstable very close to either the deassertion threshold 210 or the first reassertion threshold 213. That is, with adequate hysteresis, the reset circuit 110 will not repeatedly reassert and deassert the reset signal 116 as result of very small fluctuations in the supply voltage 113.

As shown, the first reassertion threshold 213 is set to be the specified minimum supply voltage, but in some implementations (not shown), the first reassertion threshold 213 is higher than the specified minimum supply voltage. Setting the first reassertion threshold 213 higher than the specified minimum supply voltage can, in some implementations, provide the device 104 with an extra "margin" (e.g., extra time to gracefully reset). For example, in some implementations, assertion of the reset signal 116 causes an alternate power supply (not shown) to be switched on, in order, for example, to facilitate storage of dynamic data that may be stored or processed by the device 104, or to allow for other backup measures. Switching on the alternate power supply may take a short period of time, during which the power supply voltage 113 can continue dropping. In such a scenario, it may be more likely that the supply voltage 113 will remain above the specified minimum supply voltage long enough for the alternate power supply to switch on if the device 104 has a first reassertion threshold 213 that is higher than the specified minimum supply voltage.

Figure 2B:
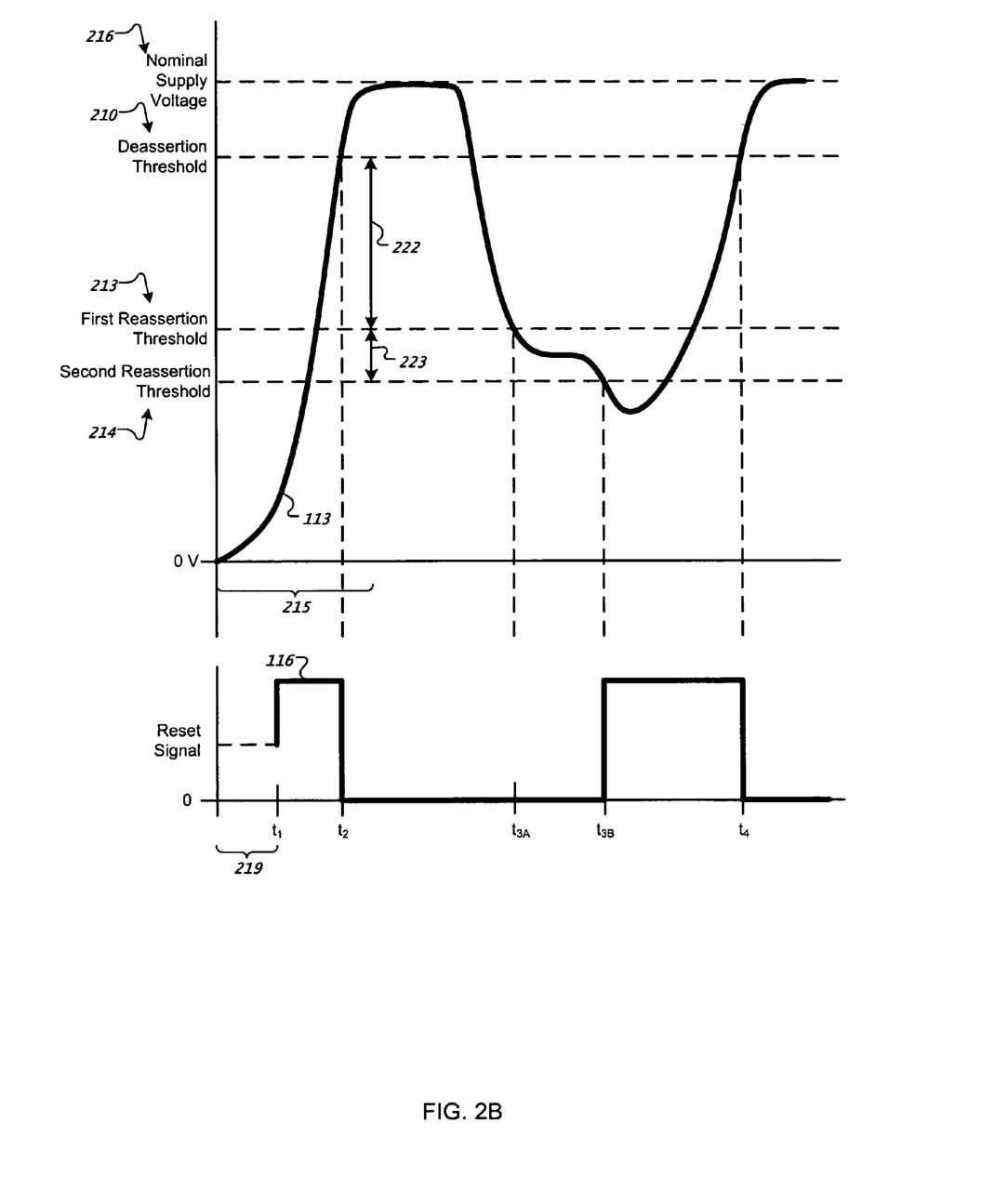
FIG. 2B is an exemplary voltage-time diagram showing a supply voltage and corresponding reset signal in a test mode.

FIG. 2B is an exemplary "test mode" voltage-time diagram showing the supply voltage 113 relative to a deassertion threshold 210, a first reassertion threshold 213 and a second (e.g., lower) reassertion threshold 214. As described above, the first reassertion threshold 213 can be a specified minimum operating voltage in some implementations. The second reassertion threshold 214 can be a lower reassertion threshold that is activated during low-voltage testing of the device 104. This lower reassertion threshold 214 can be useful in protecting the device 104 from operating in a non-deterministic manner at supply voltages that are too low for any portion of the device 104 to properly function, while still facilitating low-voltage "stress testing" of certain portions of the device 104. FIG. 2B also illustrates the corresponding reset signal 116.

As shown in FIG. 2B, the supply voltage 113 ramps up during the initial power-up phase 215 from an initial voltage (e.g., 0 V), to the nominal supply voltage 216. During an initial stage of the power-up phase (e.g., phase 219), the reset signal 116 is initially undefined; after the supply voltage 113 reaches a high enough value for the reset signal 116 to be defined (e.g., at time $t_1$) the reset signal 116 is asserted and remains asserted until the supply voltage 113 exceeds the deassertion threshold 210 (e.g., at time $t_2$). Once the supply voltage 113 reaches the deassertion threshold 210, the reset signal 116 can be deasserted, as shown, and the device 104 can be tested.

In the test mode, the supply voltage 113 can, in some implementations, fluctuate over a greater voltage range, relative to the normal operating mode, without the reset circuit 119 reasserting the reset signal 116. In particular, in the test mode as shown, the reset signal is not asserted at time $t_{3A}$, when the supply voltage 113 drops below the first reassertion threshold 213. This can facilitate low-voltage testing of the device 104. For example, in some implementations, the supply voltage 113 is held to a level between the first reassertion threshold 213 and the second reassertion threshold 214 while various functional tests are run on the device 104 (e.g., memory pattern tests, where a pattern is written to a memory circuit, then read back to determine if the read pattern matches the written pattern). In some implementations, ability of the device 104 to pass functional tests at a low voltage (e.g., a voltage lower than a specified minimum voltage—in particular, lower than the first reassertion threshold 213) can indicate that the device 104 is more robust and less likely to fail in the field than a device that does not pass similar functional tests at the low voltage.

Even in the test mode, it may be advantageous to only test operation of the device 104 with a minimum test voltage; accordingly, in some implementations (as shown), the reset circuit 110 reasserts the reset signal 116 in the test mode when the supply voltage 113 drops below the second reassertion threshold 214 (e.g., at time $t_{3B}$). In some implementations, once the reset signal 116 is reasserted, it remains asserted until the supply voltage 113 again rises above the deassertion threshold 210 (e.g., at time $t_4$). In other implementations (not shown), the reset circuit has a separate deassertion threshold that is activated in the test mode.

As described above, the difference 222 in voltage between the deassertion threshold 210 and the first reassertion threshold 213 can provide hysteresis or margin; thus, the difference 223 during the test mode between the deassertion threshold 210 and the second reassertion threshold 214 can be considered an additional margin that can facilitate low-voltage testing of the device 104.

The voltage-time diagrams of FIGS. 2A and 2B are merely exemplary. In other implementations (not shown), the reset signal 116 can be asserted or deasserted—or other actions can be taken—based on the supply voltage 113 exceeding one or more thresholds, or based on other operating parameters, such as, for example, current, temperature, humidity, EMI, frequency of a clock, etc. Moreover, a reset circuit can have one, two or more than two modes, and each mode can have one or more thresholds, which may be different between modes.

Figure 3:
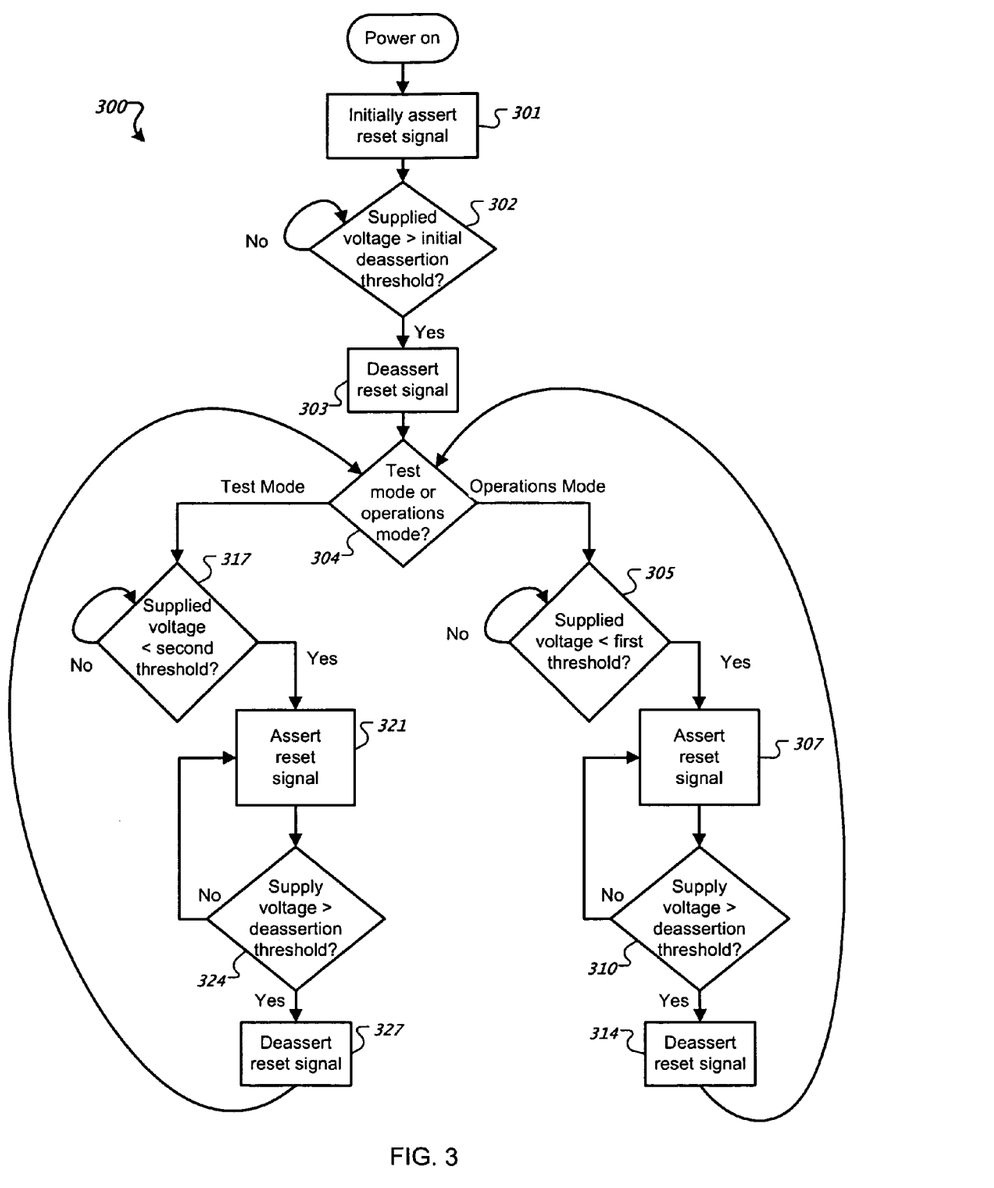
FIG. 3 is a flow diagram of an exemplary method of controlling a reset signal relative to multiple supply voltage thresholds.

FIG. 3 is a flow diagram illustrating a method 300 of asserting a reset signal. In some implementations, the method 300 can be performed by a multi-threshold reset circuit, such as the reset circuit 110 that is shown in FIG 1A. As shown, the method 300 includes initially asserting (301) the reset signal. For example, during an initial power-up phase of a corresponding device, the reset signal can be asserted (e.g., after the supply voltage has an initial value, and until the supply voltage reaches a deassertion threshold). In particular, as shown in FIGS. 1A, 2A and 2B, the reset circuit 110 asserts the reset signal 116 during an initial power-up phase 215 as soon the supply voltage 113 is high enough that the reset signal 116 is defined (e.g., at time $t_1$).

The method 300 also includes determining (302) if the supply voltage has exceeded an initial deassertion threshold. For example, the reset circuit 110 determines if the supply voltage 113 is greater than the deassertion threshold 210. If the supply voltage 113 is not greater than the deassertion threshold 210, the reset circuit 110 continues evaluating (302) the supply voltage 113 relative to the deassertion threshold 210. If the supply voltage 113 is greater than the deassertion threshold 210, then the reset circuit 110 deasserts (302) the reset signal 116 (e.g., at time $t_2$).

After the reset signal is initially deasserted (303), the method 300 includes determining (304) whether the reset signal is to be asserted (e.g., reasserted) based on a mode of operation. In the implementation shown, two modes are possible: test and operational. Other numbers and types of modes are possible. For example, with reference to FIG 1A, the reset circuit 110 determines whether it is configured to be in a test mode or a normal operating mode. In particular, the reset circuit 110, in some implementations, determines whether the signal 120 has a logic state of '0' (e.g., normal operating mode) or a logic state of '1' (e.g., test mode).

If the reset signal is to be asserted based on an first mode (e.g., an operations mode shown in the "right" path of the flow diagram shown in FIG. 3), the method 300 includes evaluating (305) whether a supply voltage is greater than a first threshold. For example, the reset circuit 110 monitors the supply voltage 113 to determine if the supply voltage 113 is above a first threshold. In particular, with reference to FIG. 2A, the reset circuit 110 monitors the supply voltage 113 to determine whether the supply voltage 113 is higher than the first reassertion threshold 213. If the supply voltage 113 is higher than the first reassertion threshold 213, then the reset circuit 110 continues evaluating (305) the supply voltage 113.

If evaluation (305) of the supply voltage reveals that the supply voltage is less than the first threshold, then the reset signal is asserted (307). For example, if in monitoring the supply voltage 113, the reset circuit 110 determines (305) that the supply voltage 113 has dropped below the first reassertion threshold 213, then the reset circuit 110 asserts the reset signal 116 (e.g., at time $t_{3A}$). As described in greater detail below, the assertion of the reset signal 116 (e.g., at time $t_{3A}$) can, in some implementations, be a reassertion of the reset signal 116.

Once the reset signal has been asserted (307), the method 300 includes determining (310) whether the supply voltage has risen above a deassertion threshold, such that the reset signal can be deasserted (314). For example, once the reset circuit 110 has asserted the reset signal 116, the reset circuit 110 continues monitoring the supply voltage 113 to determine if it has risen above the deassertion threshold 210. If the supply voltage 113 has risen above the deassertion threshold 210, then the reset circuit 110 deasserts the reset signal (e.g., at time $t_4$).

If the reset signal is to be asserted based on a second mode (e.g., a test mode shown in the "left" path of the flow diagram shown in FIG. 3), the method 300 can operate in a similar manner as described above, but with different threshold values. In particular, the method 300 includes evaluating (317) whether the supply voltage is greater than a second different threshold. For example, the reset circuit 110 monitors the supply voltage 113 to determine if the supply voltage 113 is above a second threshold. In particular, with reference to FIG. 2B, the reset circuit 110 monitors the supply voltage 113 to determine whether the supply voltage 113 is higher than the second reassertion threshold value 214. If the supply voltage 113 is higher than the first reassertion threshold 213, then the reset circuit 110 continues evaluating (317) the supply voltage 113.

If evaluation (317) of the supply voltage reveals that the supply voltage is lower than the second threshold, then the reset signal is asserted (321). For example, if in monitoring the supply voltage 113, the reset circuit 110 determines (317) that the supply voltage 113 has dropped below the second reassertion threshold 214, then the reset circuit 110 asserts the reset signal 116 (e.g., at time $t_{3B}$). In some implementations, as shown in the figures and described above, the second reassertion threshold 214 is lower than the first reassertion threshold 213 (and can be lower than a specified minimum operating voltage), for example, to facilitate low-voltage testing of a device in a test mode.

Once the reset signal has been asserted (321), the method 300 includes determining (324) whether the supply voltage has risen above a deassertion threshold, such that the reset signal can be deasserted (327). For example, once the reset circuit 110 has asserted the reset signal 116, the reset circuit 110 continues monitoring the supply voltage 113 to determine if it has risen above the deassertion threshold 210. If the supply voltage 113 has risen above the deassertion threshold 210, then the reset circuit 110 deasserts the reset signal (e.g., at time $t_4$). In some implementations (not shown in the figures), the deassertion threshold in the second (e.g., test) mode can be different than the deassertion threshold in the first (e.g., operations) mode.

As depicted by the "loopback" paths in both the left and right paths of the flow diagram in FIG. 3, the mode in which the reset signal is to be asserted can be periodically determined (304). As described above, in some implementations, the test mode is only available during a manufacturing test operation, and the test mode is irreversibly disabled following the manufacturing test operation. In other implementations, the mode by which the reset signal is to be asserted can be changed at any time, based on, for example, a configuration bit internal to a corresponding device (e.g., an internal register), a currently active circuit in the corresponding device, the logic state of an external pin, a switch, etc.

Figure 4:
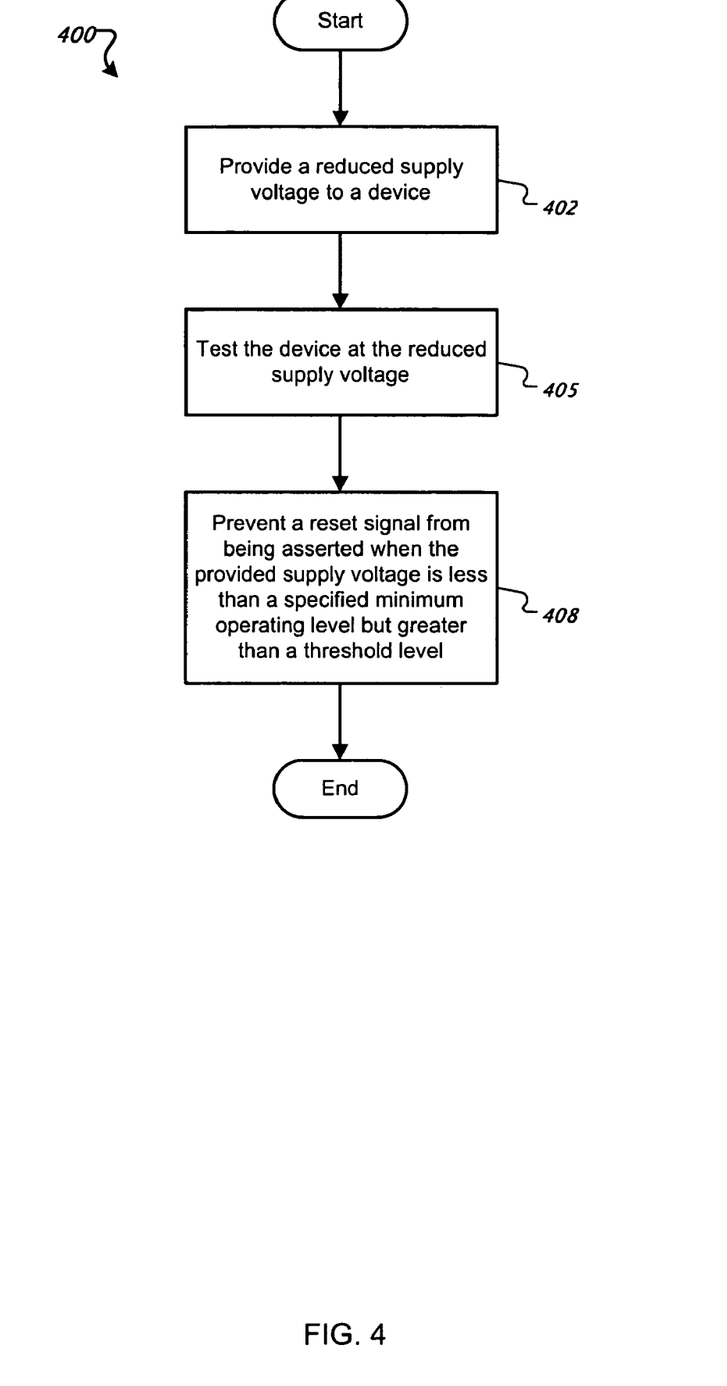
FIG. 4 is a flow diagram of an exemplary method of testing a device.

FIG. 4 is a flow diagram of a method 400 of testing a device. In some implementations, the method 400 can be performed by test equipment (not shown) that tests a device such as the device 104 that is shown in FIG. 1A. As shown, the method 400 includes providing (402) a reduced supply voltage to a device. For example, with reference to FIG 1A, the test equipment can provide a supply voltage 113 to the device 104. With reference to FIG. 2B, the supply voltage 113 is, in some implementations, lower than a specified minimum voltage of the device (e.g., the first reassertion threshold 213).

The method 400 includes testing (405) the device at the reduced supply voltage. For example, the test equipment can cause the device 104 to run functional tests at the reduced supply voltage. In particular, with continued reference to FIGS. 1A and 2B, the test equipment can cause the circuits 109A-C to be functionally tested while the supply voltage 113 is maintained at a voltage that is lower than the specified minimum voltage of the device 104 (e.g., while the supply voltage 113 is maintained between the first reassertion threshold 213 and the second reassertion threshold 214). As a more specific example, the circuit 109B can, in some implementations, be a memory circuit, and the low-voltage functional testing described above can include writing a pattern to the memory circuit, reading the pattern back from the memory circuit, and comparing the read-back pattern to the written pattern to determine if the patterns match (e.g., to determine if the memory circuit is capable of operating at a voltage that is lower than the specified minimum supply voltage). As described above, such low-voltage testing can be employed, in some implementations, to predict reliability of devices once they are deployed in the field.

The method 400 includes preventing (408) a reset signal from being asserted when the provided supply voltage is less than a specified minimum operating level but greater than a threshold level. For example, the test equipment can cause the reset circuit 110 to be configured in a test mode, where the reassertion threshold 214 of the reset circuit 110 is lower than a reassertion threshold 213 corresponding to a normal operating mode. In particular, the reset circuit 110 can be configured such that the reset signal 116 is not asserted when the supply voltage 113 is between the first reassertion threshold 213 and the second reassertion threshold 214 (as it would be if the reset circuit 110 were in the normal operating mode, as depicted in FIG. 2A). In some implementations, causing the reset circuit 110 to be configured in the test mode includes initially configuring a switching element 128. In other implementations, causing the reset circuit 110 to be configured in the test mode includes setting a register bit, activating a particular circuit 109A-C within the device 104, applying a voltage level to an external pin, or configuring the device 104 in some other appropriate manner.

A number of implementations have been described. Nevertheless, it will be understood that various modifications may be made without departing from the spirit and scope of the above-described implementations. For example, the reset circuits described above can be included in any system or device. A reset circuit can assert or deassert more than one reset signal in response to changes in the levels of multiple voltage supplies. Although reset circuits have been described in the context of a first mode and a second mode, a reset circuit can have multiple other modes, each of which can have one or more deassertion thresholds and one or more reassertion thresholds that may be different depending on the mode. A reset circuit can be configured in any manner to operate in a particular mode. The various thresholds by which a reset signal can be asserted or deasserted can be determined and evaluated by various methods and circuits that are known in the art and are not described in detail here (e.g., voltage dividers, comparators, gates, zener diodes, etc.). A reset circuit can be standalone circuit, or it can be incorporated in a power-on reset circuit, a watchdog circuit, or any other kind of circuit. A reset circuit can be physically implemented within device(s) to which it is coupled, or the reset circuit can be a standalone component. Although reset circuits have been described that assert or deassert a reset signal in response to positive direct current (DC) supply voltage, a reset circuit can also assert or deassert a reset signal in response to a negative DC voltage; in response to peak or RMS (root mean square) values of an alternating current (AC) voltage; in response to phase variation in a single-phase or multiple phase voltage; in response to peak, RMS or average DC or AC currents; in response to temperature values; or in response to other parameters that are controlled for proper operation of an electrical device. Accordingly, other implementations are within the scope of the following claims.

What is claimed is:

1. A device comprising:
    one or more circuits that are configured to be powered by a supply voltage;
    a reset circuit having a first mode and a second mode, the first mode having a first voltage threshold and a second voltage threshold, the second mode having a third voltage threshold; and
    a reset mode selector to configure the reset circuit to function in either the first mode or the second mode;
    the reset circuit being configured to a) assert a reset signal to the one or more circuits in response to a level of the supply voltage relative to the first voltage threshold or second voltage threshold when the reset circuit is in the first mode and b) assert the reset signal to the one or more circuits in response to the level of the supply voltage relative to the third voltage threshold when the reset circuit is in the second mode.

2. The device of claim 1, wherein the reset circuit is configured to assert the reset signal when the reset circuit is in the first mode and the supply voltage drops below the second threshold.

3. The device of claim 2, wherein the reset circuit is configured to assert the reset signal when the reset circuit is in the second mode and the supply voltage drops below the third threshold.

4. The device of claim 3, wherein the third threshold is lower than a specified minimum voltage for one of the one or more circuits.

5. The device of claim 1, wherein the reset circuit is configured to assert the reset signal during a power-up phase and deassert the reset signal when the supply voltage exceeds the first threshold.

6. The device of claim 1, wherein the reset circuit is configured to assert the reset signal when the reset circuit is in the first mode and the supply voltage exceeds the second threshold.

7. The device of claim 6, wherein the reset circuit is configured to assert the reset signal when the reset circuit is in the second mode and the supply voltage exceeds the third threshold.

8. The device of claim 7, wherein the third threshold is higher than a specified maximum voltage for one of the one or more circuits.

9. The device of claim 1, wherein the one or more circuits comprise at least one of a memory circuit or an embedded microcontroller.

10. The device of claim 1, wherein the reset mode selector is configured to disable the second mode until the supply voltage has initially exceeded the first threshold.

11. The device of claim 1, wherein configuring the reset circuit to function in either the first mode or the second mode comprises providing a signal to the reset circuit that has either a first state or a second state, respectively.

12. The device of claim 11, wherein the first state is a logic '1' and the second state is a logic '0'.

13. The device of claim 1, wherein the reset mode selector comprises a switching element having a first switching state and a second switching state and that, when in the second switching state, disables one of the first mode or the second mode.

14. The device of claim 13, wherein once in the second switching state, the switching element remains in the second switching state, such that either the first mode or the second mode is irreversibly disabled.

15. The device of claim 13, wherein the switching element is a fuse element, the first switching state is a closed state and the second switching state is an open state.

16. The device of claim 15, wherein the fuse element is configured to be transitioned from a closed state to an open state at an end of a manufacturing test process.

17. The device of claim 1, wherein the reset mode selector comprises a register whose current value configures the reset circuit to function in either the first mode or the second mode.

18. The device of claim 1, wherein the reset mode selector comprises an external pin whose input configures the reset circuit to function in either the first mode or the second mode.

19. A device comprising:
    one or more circuits in a device that are configured to be powered by a supply voltage having a specified minimum operating value and a specified nominal operating value;
    a reset circuit having a first voltage threshold and a second voltage threshold, the first voltage threshold having a value between the specified minimum operating value and the specified nominal operating value, the second voltage threshold having a value that is less than the specified minimum operating value; and
    a reset mode selector to configure the reset circuit to function in either an operating mode or a test mode;
    the reset circuit being configured to a) reset the one or more circuits when the device is functioning in the operating mode and the supply voltage drops below the first threshold and b) reset the one or more of circuits when the device is functioning in the test mode and the supply voltage drops below the second threshold.

20. A method of resetting a device comprising:
    determining when a device is in a first mode, and if so, asserting a reset signal to one or more circuits in the device based on a level of a supply voltage relative to a first threshold; and
    determining when the device is in a second mode, and if so, asserting the reset signal to the one or more circuits based on the level of the supply voltage relative to a second threshold;
    wherein determining when the device is in the first mode comprises determining whether a reset mode selector circuit is currently outputting a signal having a first state.

21. The method of claim 20, wherein asserting the reset signal based on the level of the supply voltage relative to the first threshold comprises asserting the reset signal when the level of the supply voltage exceeds the first threshold.

22. The method of claim 21, wherein asserting the reset signal based on the level of the supply voltage relative to the second threshold comprises asserting the reset signal when the level of the supply voltage exceeds the second threshold, wherein the second threshold is higher than the first threshold.

23. The method of claim 20, wherein asserting the reset signal based on the level of the supply voltage relative to the first threshold comprises asserting the reset signal when the level of the supply voltage drops below the first threshold.

24. The method of claim 23, wherein asserting the reset signal based on the level of the supply voltage relative to the second threshold comprises asserting the reset signal when the level of the supply voltage drops below the second threshold, wherein the second threshold is lower than the first threshold.

25. The method of claim 24, wherein the first threshold is a specified minimum operating value of device, the specified minimum operating value being a voltage value at which instances of the device from different production lots have a likelihood that exceeds a minimum threshold of functioning in a deterministic manner.

26. The method of claim 25, wherein the minimum threshold is at least 95%.

27. The method of claim 20, further comprising initially asserting the reset signal in a power-up phase during which the supply voltage increases from a low value toward a specified nominal operating value, and deasserting the reset signal when the supply voltage increases above a third threshold.

28. The method of claim 27, wherein the third threshold and the first threshold differ by a first, non-zero voltage; and the third threshold and the second threshold differ by a second, greater absolute voltage.

29. The method of claim 27, further comprising disabling the second mode until the supply voltage initially increases above the third threshold.

30. A method of resetting a device comprising:
determining when a device is in a first mode, and if so, asserting a reset signal to one or more circuits associated with the device when a supply voltage decreases below a first threshold, the first threshold having a value between a specified minimum operating value and a specified nominal operating value; and
determining when the device is in a second mode, and if so, asserting the reset signal to the one or more circuits when the supply voltage decreases below a second threshold, the second threshold having a value that is less than the specified minimum operating value;
wherein determining when the device is in the first mode comprises determining whether a reset mode selector circuit is currently outputting a signal having a first state.

31. The method of claim 30, wherein the first mode is a normal operating mode and the second mode is a production test mode.

32. The method of claim 31, wherein the production test mode is one in which the device is adapted be tested at voltages lower than the specified minimum operating value.

33. A method of testing a device comprising:
configuring a mode selector in a device to activate a test mode for circuitry corresponding to a reset signal;
providing to the device a reduced supply voltage, the reduced supply voltage having a value that is less than a specified minimum operating value of the device;
testing the device at the reduced supply voltage; and
preventing the reset signal from being asserted when the provided reduced supply voltage is less than the specified minimum operating value but more than a threshold level, when the test mode is activated.

34. The method of claim 33, further comprising allowing the reset signal to be asserted when the provided reduced supply voltage is less than the threshold level.

35. The method of claim 33, farther comprising reconfiguring the mode selector to disable the test mode after testing the device at the reduced supply voltage.

* * * * *

UNITED STATES PATENT AND TRADEMARK OFFICE
CERTIFICATE OF CORRECTION

PATENT NO. : 7,567,098 B2 Page 1 of 1
APPLICATION NO. : 11/513535
DATED : July 28, 2009
INVENTOR(S) : Louis Frew et al.

It is certified that error appears in the above-identified patent and that said Letters Patent is hereby corrected as shown below:

Column 16, Line 33 at Claim 35; replace:
"35. The method of claim 33, farther comprising reconfig-" with
-- 35. The method of claim 33, further comprising reconfig- --

Signed and Sealed this

Twenty-third Day of February, 2010

David J. Kappos
*Director of the United States Patent and Trademark Office*